Oct. 7, 1924.
R. S. TROTT
1,510,752
SPRING SUSPENSION
Filed Feb. 29, 1916 3 Sheets-Sheet 3
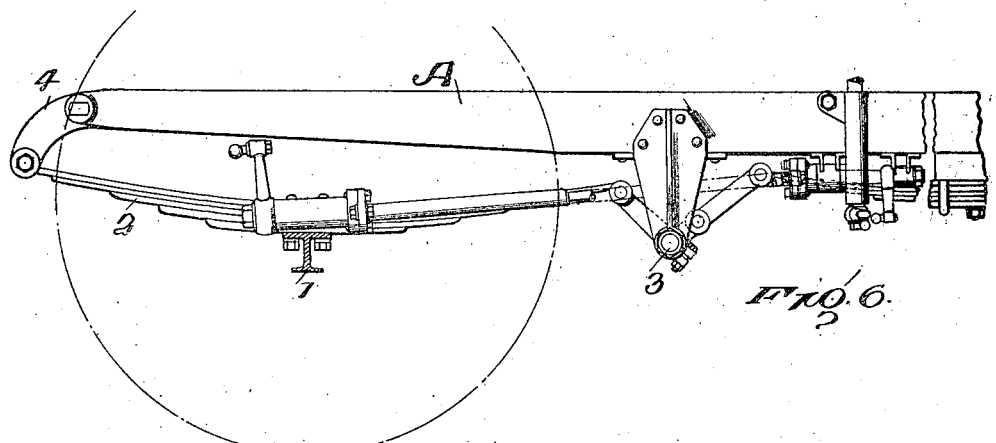
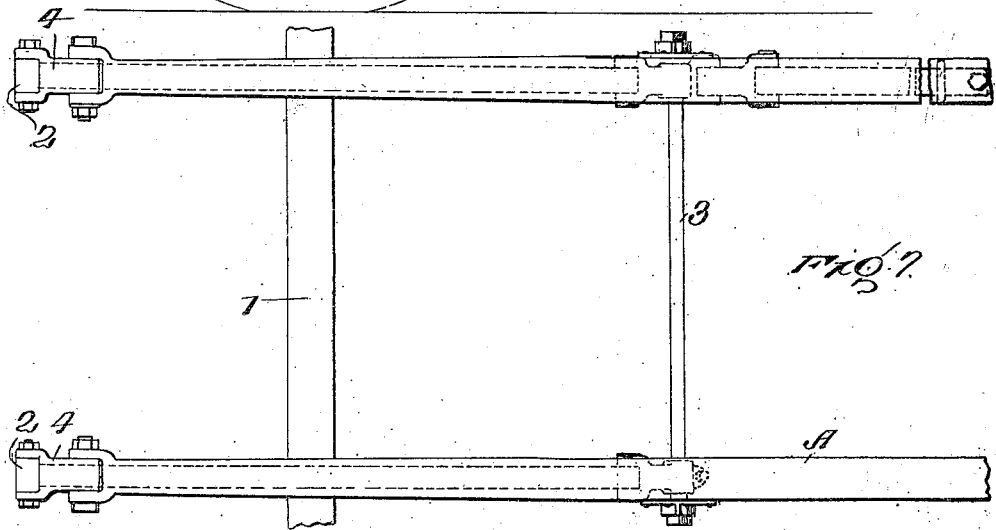
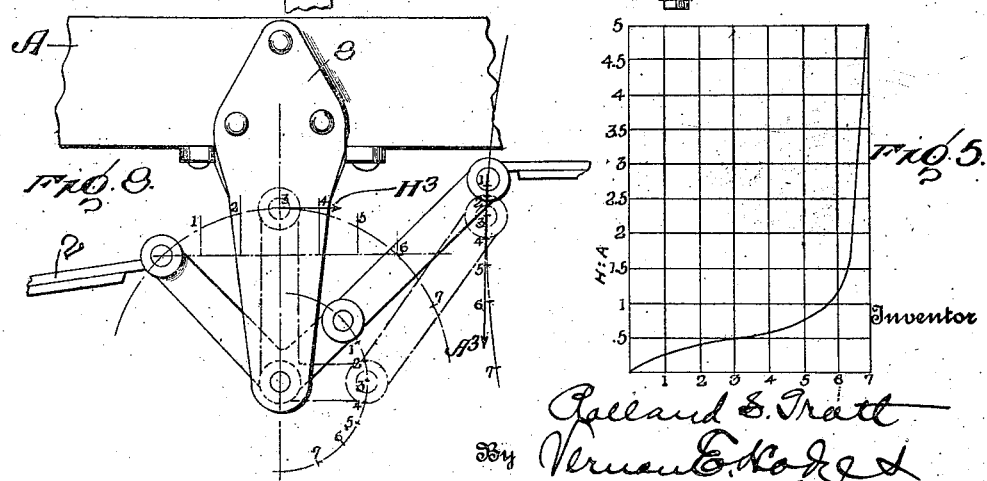
Inventor
Rolland S. Trott
By Vernon E. Hodge
his Attorney Patented Oct. 7, 1924.

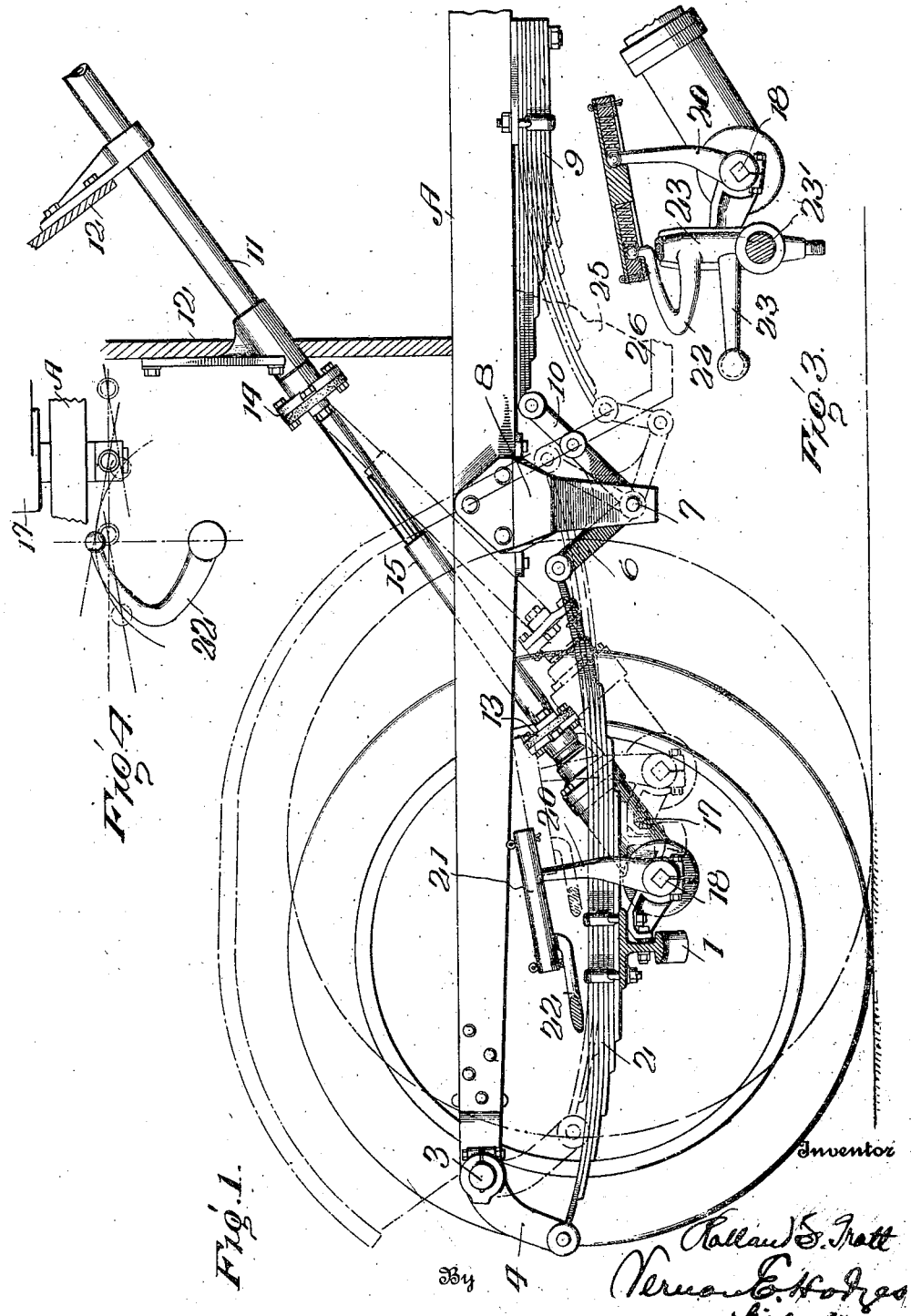

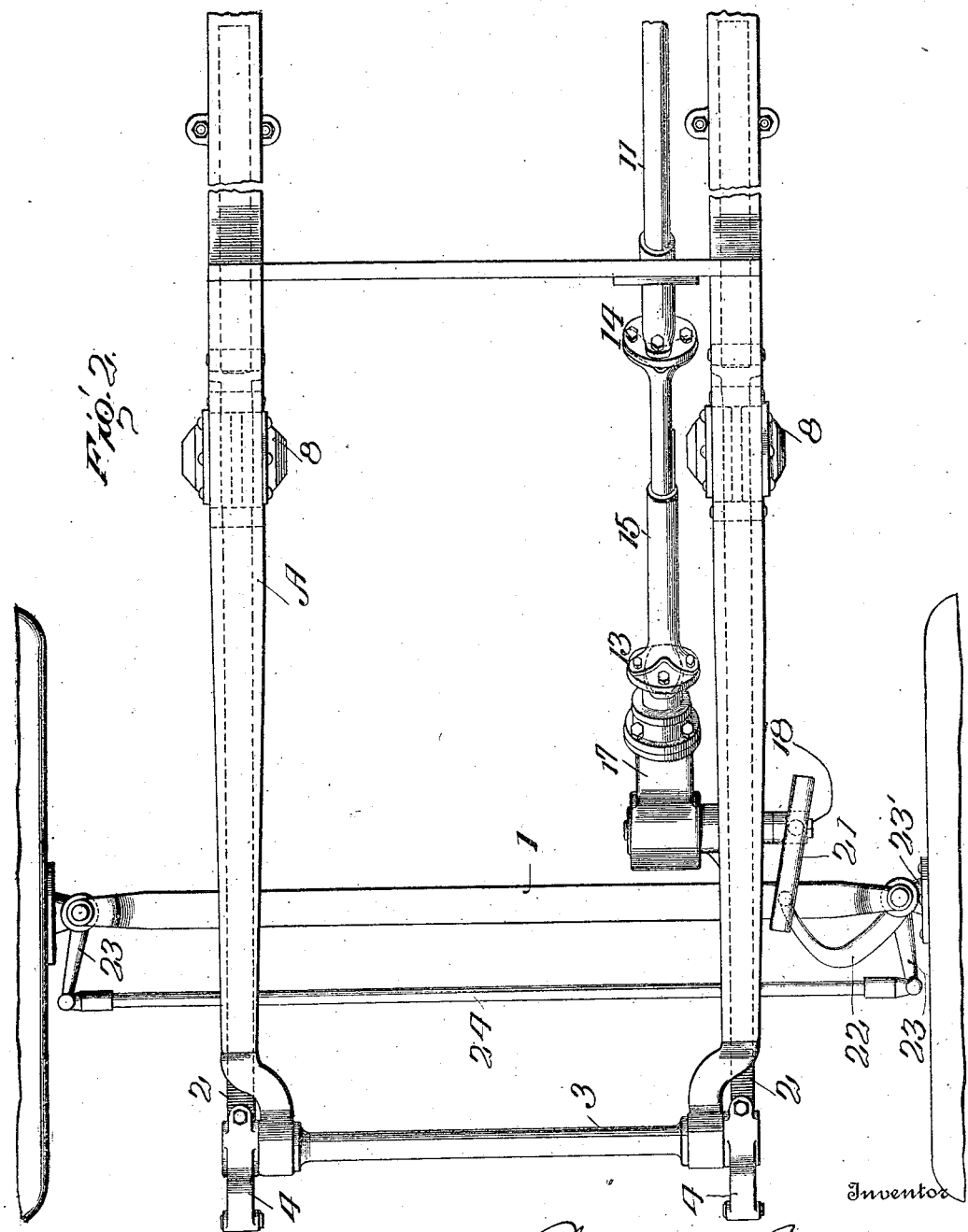

1,510,752

UNITED STATES PATENT OFFICE.

ROLLAND S. TROTT, OF DENVER, COLORADO.

SPRING SUSPENSION.

Application filed February 29, 1916. Serial No. 81,110.

*To all whom it may concern:*

Be it known that I, ROLLAND S. TROTT, a citizen of the United States, residing at the city and county of Denver, and State of Colorado, have invented certain new and useful Improvements in Spring Suspensions, of which the following is a specification.

My invention relates to an improvement in spring suspensions for motor vehicles, and is an improvement on the spring suspension, the construction of various parts of which is disclosed in application for Letters Patent, Serial No. 15,608, filed by me March 19, 1915, and other applications.

The objects of the invention is to provide an attractive appearing adaptation of my spring suspension with all its advantages retained, to the present low hung type of cars, where the radiator, engine-base, etc. are down close to the axle, making my former steering gear construction difficult to fit in and the appearance of the car ungainly, in other words adapt the suspension to these low hung cars and give a pleasing appearance.

A further object is to obtain a greater backward action for the axle in order to get better cushioning of the horizontal shocks, and also to allow greater angular action for the links, making it possible to obtain a new final compounding of the shock spring for the maximum horizontal movements, this greater backward movement being obtained by mounting the axle so that normally the links supporting the load springs are inclined forward of the vertical lines through their pivot points on the frame, that is, the normal position of the axle is forward of the central position of its total horizontal travel. This results not only in a greater backward axle movement, which is desired, but it also cuts down the possible amount of rebound of the axle forward of the normal position, which is desired almost as much.

In further explanation of the reduction in the rebound, it might be stated that it is the swing of the links that determines the maximum possible amount of rebound. For instance, a five-inch link inclined three and one-half inches forward of central position normally can allow a further forward movement of but one and one-half inches. This reduced rebound also admits of better shaped fenders.

In my present invention the links at the end of the load-springs are reversed in direction, which means also that the direction of flexion of the shock-springs has been reversed. This not only improves the appearance of the front of the car but also adds a new compounding effect on the shock springs. The steering connection from the reduction gear is outside of the frame to avoid the low radiator, engine-base, etc.

In the accompanying drawings:—

Figure 1 is a view in side elevation;

Figure 2 is a plan view;

Figure 3 is a detail of the steering-gear from the left hand side of the machine;

Figure 4 is a plan view of the bell-crank 22 with a diagram in dotted lines illustrating its various positions, as well as the various angles of the fore-and-aft rod;

Figure 5 is a development of a curve disclosing the increasing resistance or strength of the shock spring, as the axle is moved backward as shown in dotted lines of Figure 1;

Figure 6 is a side elevation of a modified form of the construction wherein the cross shaft is arranged in rear of the axle;

Figure 7 is a plan view of the same; and

Figure 8 is a detail explanatory of Figure 5.

A, represents the frame of the vehicle, and 1 is the front axle. Load-springs are represented by the numeral 2. The numeral 3 is a cross-shaft mounted to turn freely in the forward end of the frame; and 4, 4, are compression links keyed to the outer ends of the cross-shaft and curved downward, giving the conventional front frame appearance. The forward ends of the load springs 2 are suspended on the outer end of these links 4, 4, and clipped to the axle 1 in the usual manner. The rear ends of the load-springs are pivotally connected to the forward ends of the tension bell crank shackle links 6, which latter are pivotally mounted at 7 at the lower ends of brackets 8 depending from the frame. As will be seen, the links 4 and 6 project in opposite directions from their pivotal points, and, owing to their angle, one is in tension and one in compression and in reverse length ratio to the division of the spring by the axle, so that the weight on the springs does not have any tendency to move the axle horizontally. In other words, the links by their direction and lengths are such that their horizontal pulls on the axle are balanced against each other, regardless of the horizontal position of the axle. The bell crank shackles are connected to the forward ends of the shock springs 9 by link 10, as disclosed in dotted lines in Figure 1; the bell-crank shackle 6 and link 10 are placed at such a position with respect to the shock spring 9 as to give increasing strength to the shock-spring (in effect), as the axle moves backward in addition to the natural increasing stiffness of the spring, with the final stopping due to the link pulling in almost a straight line with the length of the shock-spring. As shown in modified form in Figure 6, the cross-shaft 3 might well be placed in rear of the axle, in which case the bell-crank shackle 6 would be keyed to the cross-shaft, and if desirable, one shock-spring only might be used. The forward compression links 4—4 are pivoted at the outer ends of the frame and curved downward and adapted to receive the outer ends of the load-spring 2.

The steering column 11 is supported on the front cowl and dash 12—12. Two universals 13 and 14 are formed in the steering column with an extensible section 15 therebetween, and the steering column terminates at its lower end in a reduction-gear, which is encased in the box 17 bolted to the axle 1. Within this box is journaled the spindle 18 of the reduction-gear.

To the outer end of the spindle, an arm 20 is fastened, and from the upper end of this arm a fore-and-aft rod 21, with ball or universal joints, extends to a bell-crank 22, and this bell-crank is integral or otherwise secured to the stub-axle 23' and the steering knuckle lever 23, which lever is connected with the corresponding lever on the outer side by the tie rod 24.

This arrangement of steering gear is applicable to situations where it is impossible to mount the steering-gear on the axle and use cross steering, the fore-and-aft rod and three bell-cranks or other levers being used instead of two bell-cranks and a cross steering-rod.

By means of this improved steering mounting, the angle is divided (as shown in dotted lines in Figure 4) so that the maximum angularity on each side of both the vertical and horizontal planes through the line of travel of the two arm ends, is approximately about eight degrees.

From the foregoing arrangement it will be seen that while the position of the steering-gear remains the same as in my former application, Serial No. 1260, with the gear bolted rigidly to and carried by the front axle, the arm 20 extends upward instead of downward, and is located between the wheel and the spring, the spindle of the reduction gear is horizontal and running under the spring just back of the axle, the reduction gear therefore being inside the spring just in the right position for the steering column. While the fore-and-aft rod is, in consequence, comparatively short, namely in the neighborhood of four inches, and would ordinarily make the angles quite large, by the proper positioning these angles are just halved.

All of the essential parts of the mechanism described are substantially concealed by the mud-splasher 25 and running-board 26.

Special attention is called to the curve shown in Figure 5. The ordinates represent the ratio between the horizontal force tending to move the axle backwards and the active force acting tangent to the line of travel of the eye of the shock spring. The abscissæ represent the number of inches of axle movement back of the normal position.

From the curve it will be seen that when the axle is one inch back, the ratio of H to A is about one-fourth, which means that it takes only a quarter of a pound applied horizontally to the axle to make one active pound at the shock spring. Three inches back of the normal position it takes one-half a pound at the axle to give one pound at the shock spring, or just twice as much as at one inch back of normal position. Six inches back of the normal position the ratio is about one to one, or four times as much as at one inch. My new compounding effect is now coming into action, for the short arm of the bell crank has passed over the center and its end is now beginning to move away from the shock spring, tending to pull more and more in the direct line of the spring. This results in an enormous compounding effect, for it will be seen that seven inches back of the normal position the ratio of H to A has risen to five, which is five times what it is at six inches and twenty times what it is at one inch.

In effect this means that in addition to the natural stiffening of the shock-spring with its deflection, it is twenty times stronger at seven inches than it is at one inch back of the normal position. Should any slight further backward action take place, the compounding continues at an even faster rate, which, however, hardly need be considered for practical commercial use.

If the front wheels of an automobile are pushed firmly against an obstacle, such as a curbstone, for instance, and the car brought to a stop in that position, then if the clutch be again slowly let in and the wheels forced up over the obstacle, there will be no shock to the car.

This is because there was a firm contact between the wheels and the curbstone before the power that forced the wheels to mount was applied. As an illustration, it may be said that such a result is aimed at in this invention without the necessity of first stopping the car and carefully obtaining the firm contact between the wheels and the obstacle. For this purpose, it is desired to make the shock springs so weak at the start that contact will be imperceptible to the passengers of the auto, and this contact will be firmly established before the final force of the car is applied.

With my former construction, this worked all right for small and medium-sized obstacles, but when a shock was encountered greater than the shock spring was able to absorb, the final arresting of the backward movement of the axle was due not only to the resilient action of the shock spring, but finally to the very positive limit of the link swing. This resulted in a kind of jerk at the final stage of the backward axle movement on the large shocks. And without some final compounding, such as herein described, this is always likely to happen.

For, if the shock spring is designed strong enough to stop the axle movement resiliently before the link stoppage occurs for a certain size of obstacle and a certain speed, it will be too weak for larger obstacles at higher speeds; and the suspension really should be designed to fit not merely certain cases, but all cases. This final compounding, enormous as it may be made, takes care of this maximum shock whatever it may be, and automatically compounds the strength of the spring as the demands upon it arise, to a point beyond anything possible in even the very roughest driving; and making the normal position of the axle a certain distance in front of the central position adds just that much to the backward movement possible before the limit of the link swing positively stops the backward movement; so that these two factors working together insure the stopping of the backward movement of the axle resiliently even in the most extreme cases.

It will be readily seen that there are many factors in this construction that determine the rate of compounding of the shock spring, such as:—the distance the normal axle position is in front of the central position; the angle between the arms of the bell-crank; the ratio between the lengths of the two arms of the bell-crank; the length of the link; the length of the shock-spring; the camber of the shock-spring; and the position of mounting of the shock-spring.

As all these factors bear on the matter, it will be seen that by proper design a wide range of variation in the compounding is obtainable.

For instance, the proportions shown in Figure 1 will produce a slightly different shock curve from that produced by the proportions shown in Figure 8, as seen in Figure 5.

Therefore, I do not wish to confine myself closely to any one set of dimensions, or any particular curve of compounding, but wish to cover broadly the normal off-center position of the axle, the front and rear links proportioned to the division of the load-spring by the axle, and the final shock-spring compounding tending toward a pull in line with the shock-spring.

In using this off-center normal position of the axle, it is necessary to mount the load-springs in such a way that the weight of the car has little or no tendency to move the axle horizontally in either direction. This is done, as will be seen in the drawings, by proportioning the front and rear links that carry the load-spring inversely with respect to the division of the load-spring by the axle.

If the axle were in the exact middle of the load-spring, then with links at each end of equal length, and each the same amount off center, the weight of the car would in no way tend to move the axle horizontally as this tendency in the two links is balanced, one by the other.

But, as is now standard practice almost without exception, the axle is mounted on the spring forward of its center, leaving the spring in front of the axle shorter than that back of the axle; this means that the longer division of the spring will bear less weight than the shorter end, and with equal length links and equal distances off center, it will have a smaller horizontal pull due to the weight, than the front link.

In order to equalize these pulls, therefore, the front and rear link lengths should vary inversely as the divisions of the spring by the axle. As the camber of the spring and the amount of tilt the spring has when normal enter into the parallel action of the axle with respect to the frame, in its horizontal movement, this inverse proportion may not always be exact, but it will be approximately so.

I claim:

1. A shock spring mounting for vehicles comprising a frame, an axle movable horizontally, a tension link, a compression link, both links normally swung forward of their central position, a load spring connecting the axle to the links, a shock spring under tension but carrying preferably none of the load mounted upon the frame, and means including a link connected to one set of said links for resisting the horizontal movement of the axle.

2. A shock spring mounting for vehicles comprising a frame, an axle movable horizontally, a tension link, a compression link, both links normally swung forward of their central position, a load spring connecting the axle to the links, a shock spring under tension but carrying practically no load, mounted on the frame and connected to one of said links.

3. A shock spring mounting for vehicles comprising a frame, an axle mounted to move both vertically and horizontally, tension links and compression links on each side of the frame and normally swung forward of their central position, load springs connecting the axle to the links, a cross shaft rotatably mounted on the frame and to which two of said links of like kind are keyed, whereby both of said links must have the same angular movement, and means under tension but carrying none of the load connected to one set of links for resiliently resisting the horizontal movement of the axle.

4. A shock spring mounting for vehicles comprising a frame, an axle capable of both vertical and horizontal movement, a load spring, a shock spring under tension but carrying none of the load, the one secured to the axle and the other to the frame, and links pivotally supported on the frame and normally swung forward of the central position, and to which said springs are connected.

5. A shock spring mounting comprising a frame, axle, two links pivotally supported on the frame and normally swung forward of the central position, the one link extending downwardly and the other link extending upwardly from the frame, a load spring secured to the axle and connected with said links, a shock spring under tension but carrying none of the load secured to the frame, a toggle link extending from one of said links to said shock spring whereby horizontal movement of the axle imparts movement to the shock spring.

6. The combination with the frame of a vehicle of a spring equipped axle, means connecting the axle and frame permitting of horizontal axle movement balanced so that the weight on the springs has no tendency to produce such horizontal movement, the axle normally forward of the center point of its horizontal travel, means for maintaining the axle at right angles to the line of draft, shock springs under tension but carrying none of the load mounted on the frame, and means forming a progressively decreasing leverage between the axle and the shock springs with horizontal axle movement either way of the normal position.

7. In a horizontal cushioning spring suspension composed of a frame, an axle adapted for vertical and horizontal movement, a load spring, connecting means between springs and frame unaffected horizontally by the weight upon said spring, means to keep the axle square with the line of draft, a shock spring under tension but carrying none of the load, means including a link, connecting the axle with the shock spring in such a manner that the pull of said link on the shock spring approaches coincidence with the longitudinal extent of the shock spring as the limit of horizontal axle travel is approached.

8. In a horizontal cushioning vehicle spring suspension, load springs, a horizontally movable axle, shock springs under tension but carrying practically none of the load, means mounting one end of the shock springs and connected to the axle in such a manner that the resistance to horizontal movement of the axle is increased with the amount of such movement by other means and in addition to the stiffening of the shock springs with their deflection.

9. In a horizontal cushioning vehicle spring suspension, load springs, a horizontally movable axle, shock springs under tension but carrying none of the load, means mounted on the frame and connected to the shock springs and to the axle in such a manner than an on-center position is the normal position, in such a manner that said means acts along a line approaching the extent of the shock springs as the horizontal axle movement approaches its limit in either direction from said normal position.

10. A shock spring mounting for vehicles comprising a frame, load springs, an axle movable horizontally, means in connection therewith unaffected horizontally by weight upon the axle and causing the movement of the axle to be practically parallel with the frame, means under tension but carrying practically none of the load to resiliently oppose this movement by a progressively compounding leverage.

11. A shock spring mounting for vehicles comprising a frame, an axle, movable horizontally, a tension link, a compression link, a load spring connecting the axle to the links, a shock spring under tension but carrying practically none of the load, and means connecting the shock spring to the axle for resiliently resisting horizontal movement thereof.

12. A shock spring mounting for vehicles comprising a frame, movable in a horizontal direction, a tension link, a compression link, the links normally swung forward of their central position, the compression link extending downwardly from its frame pivot and the tension link extending upwardly from its frame pivot in such manner that the load is neither materially raised nor lowered in the horizontal movement of the axle, a cross shaft rotatably mounted in the frame, and means connecting the cross shaft to the axle to keep the same square with the line of draft.

13. A shock spring mounting comprising a frame, an axle, two links pivotally supported in the frame and normally swung forward of the center position, one of said links extending downwardly, and the other of said links extending upwardly, a load spring secured to the axle and connected with the links, a shock spring under tension but carrying none of the load secured to the frame, and means connected to the axle including a link connecting to the shock spring in such a manner that horizontal movement of the axle in either direction from the normal position will deflect the shock spring and at the limit of travel tend to draw the link and shock spring into substantial alignment.

14. A shock spring mounting for vehicles comprising a frame, a horizontally movable axle normally forward of the middle of its travel, load springs, front and rear links swung normally forward of their center position and proportioned to the division of the load spring from the ends by the axle and connecting the load springs to the frame, a shock spring under tension but carrying none of the load mounted on the frame and means connecting the shock spring to the axle, whereby a compounding of the spring resistance is effected tending toward a pull in line with the shock spring by horizontal axle movement either side of the normal axle position.

15. A shock spring mounting for vehicles comprising a frame, a compression link pivoted thereto and adapted to extend downwardly and forwardly from its pivotal point, a substantially V-shaped tension link pivoted to said frame, the outer free ends thereof adapted to extend upwardly and outwardly from their pivotal point, an axle, a load spring connecting the axle and the forwardly extending portion of the compression and tension links, and a shock spring flexibly connected to the opposite upwardly and outwardly extending end of the tension link for resiliently resisting the horizontal movement of the axle.

16. A shock spring mounting for vehicles comprising a frame, an axle, tension links and compression links on each side of the frame, the compression links forming pivoted downward extensions at the forward end of the frame, and extending forwardly of their pivotal points, the tension links being substantially V-shaped in form, the outer free ends thereof extending upwardly and outwardly from their pivotal point, load springs connecting the axle to the compression spring and the forwardly-extending portion of the V-shaped tension links, a cross-shaft rotatably mounted on the frame and to which two of said links of a like nature are keyed, whereby to keep the axle square with the frame, and a shock spring flexibly connected with the opposite upwardly and outwardly extended portion of the V-shape tension link for resiliently resisting the horizontal movement of the axle.

17. A shock spring mounting for vehicles comprising a frame, an axle, tension links and compression links on each side of the frame, the compression links forming pivoted downward extensions at the forward end of the frame, load-springs connecting the axle to the links, a cross-shaft rotatably mounted on the frame and to which two of said links of a like kind are keyed, whereby to keep the axle square with the frame, and means connected to one set of links for resisting the rear movement of the axle.

18. The combination with the frame of a vehicle, of a spring-equipped axle, balanced means connecting the axle and frame permitting of a horizontal axle movement, means for maintaining the axle at right-angles to the line of draft, shock-springs mounted on the frame, and means forming a progressively decreasing leverage between the axle and the shock-springs with backward horizontal axle movement.

19. In a horizontal cushioning spring suspension composed of a frame, axle, load-springs, balanced connecting means between the springs and frame, means to keep the axle square with the frame, shock-springs, bell-crank means for mounting one end of the load-spring, and means connecting the bell-crank means with the shock spring, in such a manner that the pull on the shock-spring approaches coincidence with the longitudinal extent of the shock-spring toward the limit of backward axle travel.

20. In a shock spring mounting, a shock spring whose spring eye moves substantially in the arc of a circle, a pivotal member, a fulcrum, means mounting said spring and said fulcrum, means connected to said member tending to revolve same, and means connected to said member tending to assume a position approximately tangent to said arc of movement of the end of the spring with the maximum rotation of said member.

21. In a shock spring mounting, a shock spring whose eye moves substantially in the arc of a circle, a revolvable member, means mounting said spring and said member, and means associated with said spring and said member and tending to produce a pull upon said spring approximately tangent to said arc of movement of the end of the spring with the maximum rotation of said revolvable member.

22. A shock spring mounting comprising a shock spring, a revolvable member, means mounting said spring and said member, and means connected to the shock spring to pull in a line approaching its length with the maximum rotation of said member.

23. In a shock spring mounting, a shock spring, a revolvable member, means mounting said spring and said member, including a vehicle frame, an axle, means connecting said axle to said member, and means connecting said spring and said member tending to pull in line with said spring with the maximum movement of said axle.

In testimony whereof I affix my signature.

ROLLAND S. TROTT.